(12) United States Patent
Hou

(10) Patent No.: US 6,619,824 B1
(45) Date of Patent: Sep. 16, 2003

(54) WARNING STRIP FOR AUTOMOBILES

(76) Inventor: Fu-Cheng Hou, P.O. Box 90, Tainan City (TW)

( * ) Notice: Subject to any disclaimer, the term of this patent is extended or adjusted under 35 U.S.C. 154(b) by 0 days.

(21) Appl. No.: 10/327,918

(22) Filed: Dec. 26, 2002

(51) Int. Cl.[7] .......................................... F21W 101/00
(52) U.S. Cl. ...................... 362/501; 362/540; 362/545; 362/546
(58) Field of Search .................. 362/545, 544, 362/543, 540, 541, 542, 501, 249, 546, 252

(56) References Cited

U.S. PATENT DOCUMENTS 5,038,255 A * 8/1991 Nishihashi et al. ........... 362/61
5,255,165 A * 10/1993 Call .......................... 362/80.1
5,884,997 A * 3/1999 Stanuch et al. ............. 362/493
6,149,288 A * 11/2000 Huang ........................ 362/545
6,505,963 B1 * 1/2003 Chiang ....................... 362/545

* cited by examiner

Primary Examiner—Laura K. Tso

(57) ABSTRACT

A warning strip for automobiles in the present invention mainly includes a body, a tape, a circuit board and a transparent cover. Only to remove a tear-off sheet from the tape, and then the warning strip can be attached to an appropriate place of an automobile with cords of the circuit board connected to power source of the automobile to make a plurality of light-emitting diodes (LED) of the circuit board emit light capable of being changed with one or more colors and passing through a transparent cover to perform warning function so that other drivers can immediately pay attention to the existence of the automobile and keep safe distance with the automobile so as to avoid car collisions that often happen in low light conditions, thus greatly increasing the safety of the automobile.

2 Claims, 3 Drawing Sheets

WARNING STRIP FOR AUTOMOBILES

BACKGROUND OF THE INVENTION

1. Field of the Invention

This invention relates to a warning strip for automobiles, particularly to one only to remove a tear-off sheet from a tape and then the warning strip can be attached to an appropriate place of an automobile with cords of a circuit board connected to power source of the automobile to make a plurality of light-emitting diodes (LED) of the circuit board emit light capable of being changed with one or more colors and passing through a transparent cover to perform warning function so that other drivers can immediately pay attention to the existence of the automobile and keep safe distance with the automobile so as to avoid car collisions that often happen in low light conditions, thus greatly increasing the safety of the automobile.

2. Description of the Prior Art

Generally speaking, most automobiles are equipped with basic lamps, such as headlights, taillights and turn signal lights that only can provide the automobiles with basic light performance of white, red and yellow colors in driving. Only few automobiles have their car bodies installed with additional decorative strips that can effectively warn other drivers to pay attention to the existence and the possible driving routes of the automobiles to avoid car collisions that often happen in low light conditions. However, now people deeply understand the importance of their safety in driving so that nowadays automobiles are required not only to be equipped with safety equipments, but also to be installed with humanized peripheral accessories that are very popular and even become a great attraction for people to buy cars. Under the fashion, such peripheral accessories are produced to show varied changes, such as decorative strips capable of flashing light of various colors. In fact, the peripheral accessories expected to have unlimited commercial development in the near future have already been seen in many places, such as car shows, car department stores, and running automobiles on which varied attractive accessories are installed.

SUMMARY OF THE INVENTION

The main purpose of the present invention is to offer a warning strip for automobiles capable of performing warning function to make other drivers immediately pay attention to the existence of an automobile installed with the warning strip and keep safe distance with the automobile so as to avoid car collisions that often happen in low light conditions, thus greatly increasing the safety of the automobile.

The main feature of the present invention is to provide a warning strip for automobiles including:
  a body having at least one groove disposed at a back thereof and a recess disposed at a front thereof;
  at least one tape capable of being placed in the at least one groove of the body and each provided with a tear-off sheet disposed at one side thereof;
  a circuit board capable of being placed in the recess of the body, and having a plurality of light-emitting diodes (LED) disposed thereon as well as cords connected at a lower portion thereof; and,
  a transparent cover capable of being welded to the front of the body and having two projecting ridges disposed on an inner side thereof.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
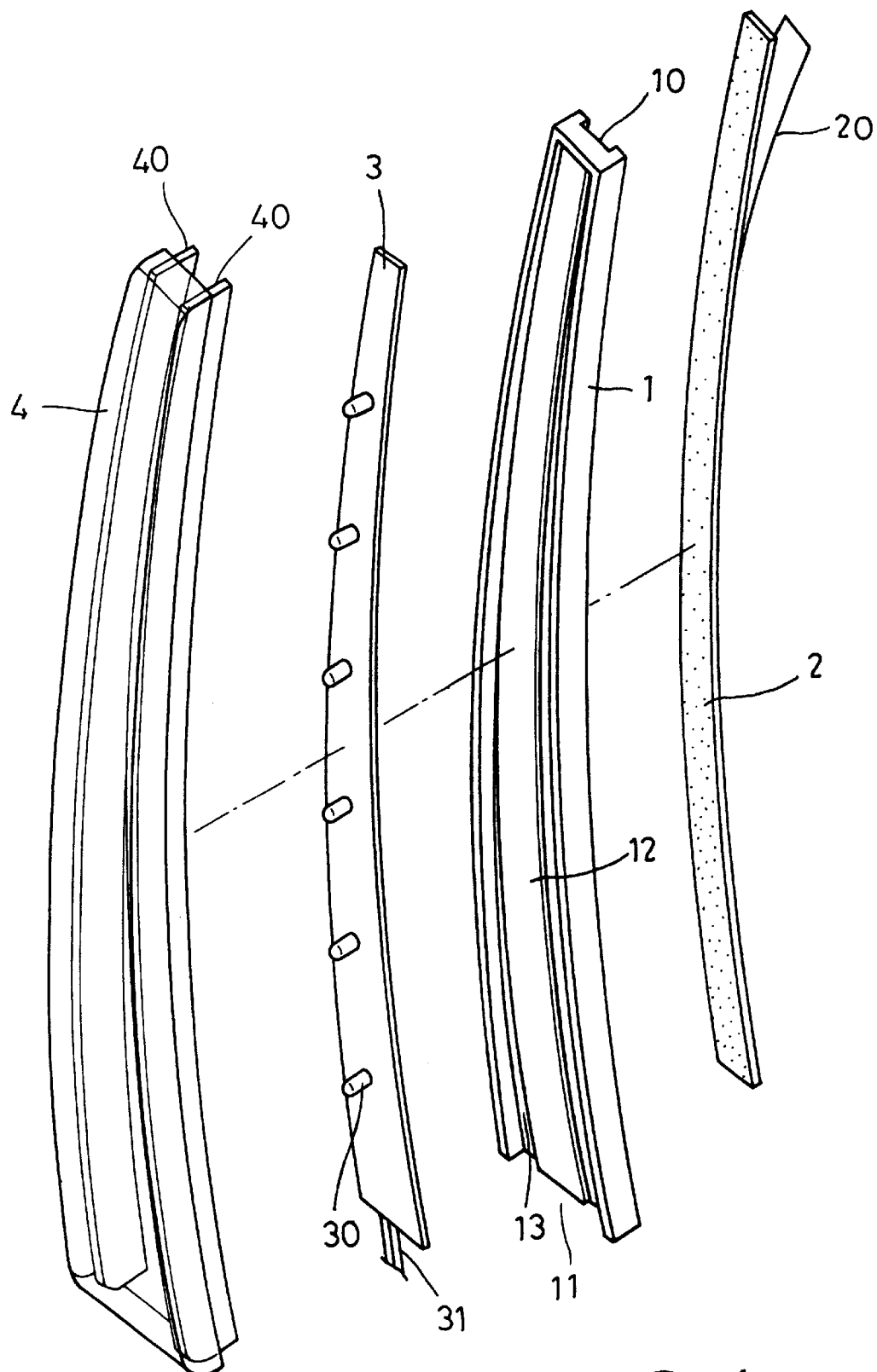
FIG. 1 is an exploded perspective view of a warning strip for automobiles in the present invention.
Figure 2:
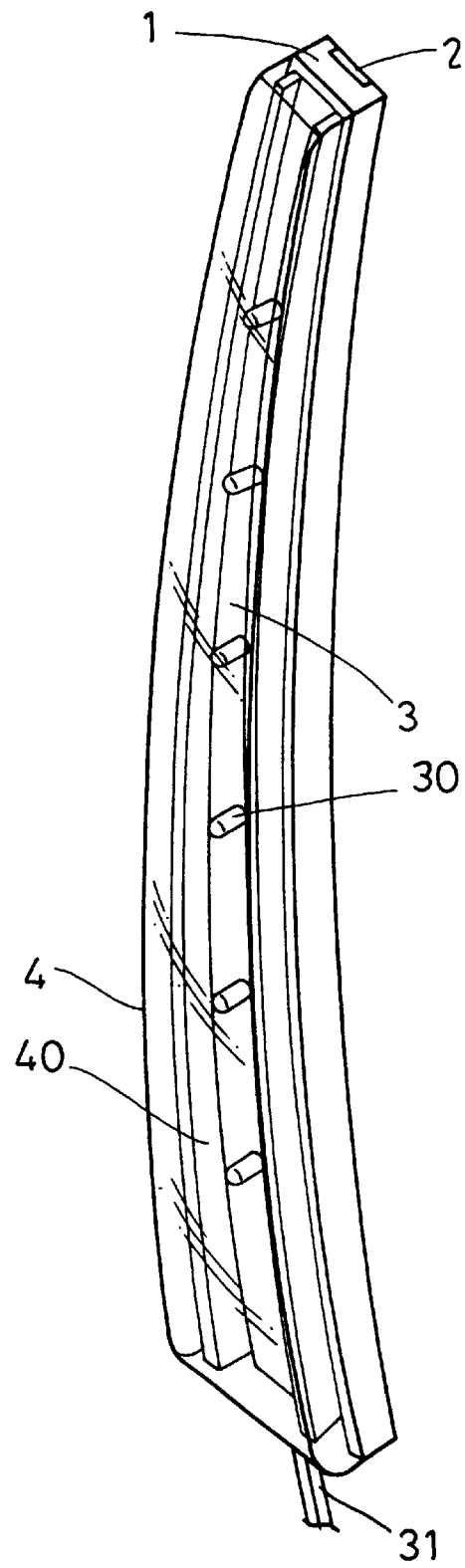
FIG. 2 is a perspective view of the warning strip for automobiles in the present invention; and, FIG. 3 is a schematic view of the warning strip for automobiles in the present invention being in use.

A preferred embodiment of a warning strip for automobiles in the present invention, as shown in FIGS. 1 and 2, mainly includes a body 1, a tape 2, a circuit board 3 and a transparent cover 4.

The body 1 in longitudinal rectangular and curved shape is getting wider from top to bottom. Moreover, the body 1 has a groove 10 disposed at a back thereof and a recess 11 disposed at a front thereof. The recess 11 is provided with a raised part 12 therein and two engagement grooves 13 respectively disposed at both sides of the raised part 12.

The tape 2 capable of being placed in the groove 10 of the body 1 has a tear-off sheet 20 disposed at one side thereof.

The circuit board 3 capable of being placed in the recess 11 of the body 1 has a plurality of light-emitting diodes (LED) 30 disposed thereon and cords 31 connected at a lower portion thereof.

The transparent cover 4 capable of being welded to the front of the body 1 has two projecting ridges 40 disposed on an inner side thereof.

Figure 3:
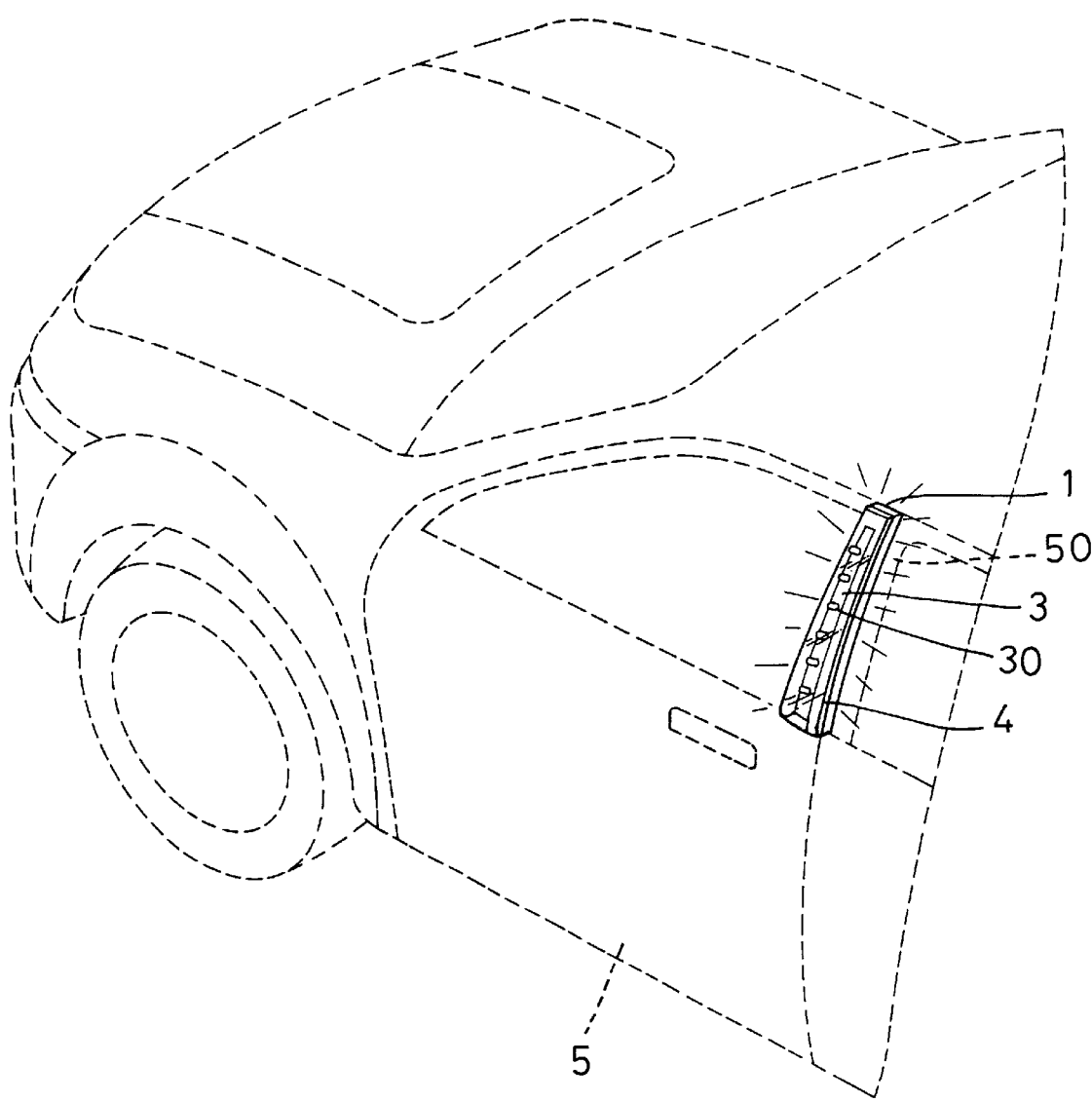

In using, referring to FIGS. 1 to 3, only to remove the tear-off sheet 20 from the tape 2 and then the warning strip can be attached to a center pillar 50 of a door 5 of an automobile or an appropriate place of the automobile with the cords 31 of the circuit board 3 connected to power source of the automobile to make the plurality of light-emitting diodes (LED) 30 of the circuit board 3 emit light capable of being changed with one or more colors and passing through the transparent cover 4 to perform warning function so that other drivers can immediately pay attention to the existence of the automobile and keep safe distance with the automobile so as to avoid car collisions that often happen in low light conditions, thus greatly increasing the safety of the automobile.

While the preferred embodiment of the invention has been described above, it will be recognized and understood that various modifications may be made therein and the appended claims are intended to cover all such modifications that may fall within the spirit and scope of the invention.

What is claimed is:

1. A warning strip for automobiles comprising:
  a body having at least one groove disposed at a back thereof and a recess disposed at a front thereof;
  at least one tape capable of being placed in said at least one groove of said body and each provided with a tear-off sheet disposed at one side thereof;

a circuit board capable of being placed in said recess of said body and having a plurality of light-emitting diodes (LED) disposed thereon as well as cords connected at a lower portion thereof;

a transparent cover capable of being welded to said front of said body and having two projecting ridges disposed on an inner side thereof; and, whereby only to remove said tear-off sheet from said tape and then said warning strip can be attached to an appropriate place of an automobile with said cords of said circuit board connected to power source of said automobile to make said plurality of light-emitting diodes (LED) of said circuit board emit light capable of being changed with one or more colors and passing through said transparent cover to perform warning function so that other drivers can immediately pay attention to the existence of said automobile and keep safe distance with said automobile so as to avoid car collisions that often happen in low light conditions, thus greatly increasing the safety of the automobile.

2. The warning strip for automobiles as claim 1, wherein said recess of said body is provided with a raised part therein and two engagement grooves respectively disposed at both sides of said raised part for the engagement of said two projecting ridges of said transparent cover so as to fix said transparent cover in position.

* * * * *